Aug. 13, 1963 — E. B. NOLT ETAL — 3,100,437
HAY BALER
Original Filed Oct. 29, 1958 — 4 Sheets-Sheet 1

INVENTORS
Edwin B. Nolt +
James W. McDuffie
Joseph Allen Brown
ATTORNEY

Aug. 13, 1963 E. B. NOLT ETAL 3,100,437
HAY BALER
Original Filed Oct. 29, 1958 4 Sheets-Sheet 2

INVENTORS
Edwin B. Nolt +
James W. McDuffie
Joseph Allen Brown
ATTORNEY

Aug. 13, 1963    E. B. NOLT ETAL    3,100,437
HAY BALER
Original Filed Oct. 29, 1958    4 Sheets-Sheet 4

INVENTORS
Edwin B. Nolt +
James W. McDuffie
Joseph Allen Brown
ATTORNEY

3,100,437
HAY BALER

Edwin B. Nolt and James W. McDuffie, New Holland, Pa., assignors to Sperry Rand Corporation, New Holland, Pa., a corporation of Delaware
Original application Oct. 29, 1958, Ser. No. 770,409, now Patent No. 3,040,508, dated June 26, 1962. Divided and this application Oct. 31, 1960, Ser. No. 66,288
3 Claims. (Cl. 100—179)

This invention relates generally to hay balers and more particularly to improved drive means for an automatic hay baler. This application is a division of our patent application Ser. No. 770,409, filed October 29, 1958, now Patent No. 3,040,508.

Conventionally, a baler has a fore-and-aft extending bale case. A plunger is reciprocable within the bale case and toward and away from a rear end thereof. The drive means for reciprocating the plunger may come from a power-take-off connection with the tractor towing the baler or from an engine mounted on the bale case. The plunger is reciprocated by a crank arm rotatable about an axis transverse to the extension of said bale case. A gear box having hypoid, spiral and/or bevel gearing is utilized to provide a right angle drive to the crank arm from a fore-and-aft input drive shaft. While such drive means is effective, it is expensive, requiring costly tooling and fabrication.

One object of this invention is to provide a right angle baler drive which is simple and inexpensive relative to baler drives of prior design.

Another object of this invention is to provide a baler drive which is compact, rugged and relatively easy to assemble and repair.

Another object of this invention is to provide a baler drive which eliminates the costly input drive gear boxes ordinarily found on balers.

A further object of this invention is to provide a baler drive in which drive and driven components are carried on a common support affixed to the bale case of the baler whereby the components will stay in the same relative position to each other regardless of the disposition of the support relative to the bale case.

Other objects of this invention will be apparent hereinafter from the specification and from the recital in the appended claims.

Figure 1:
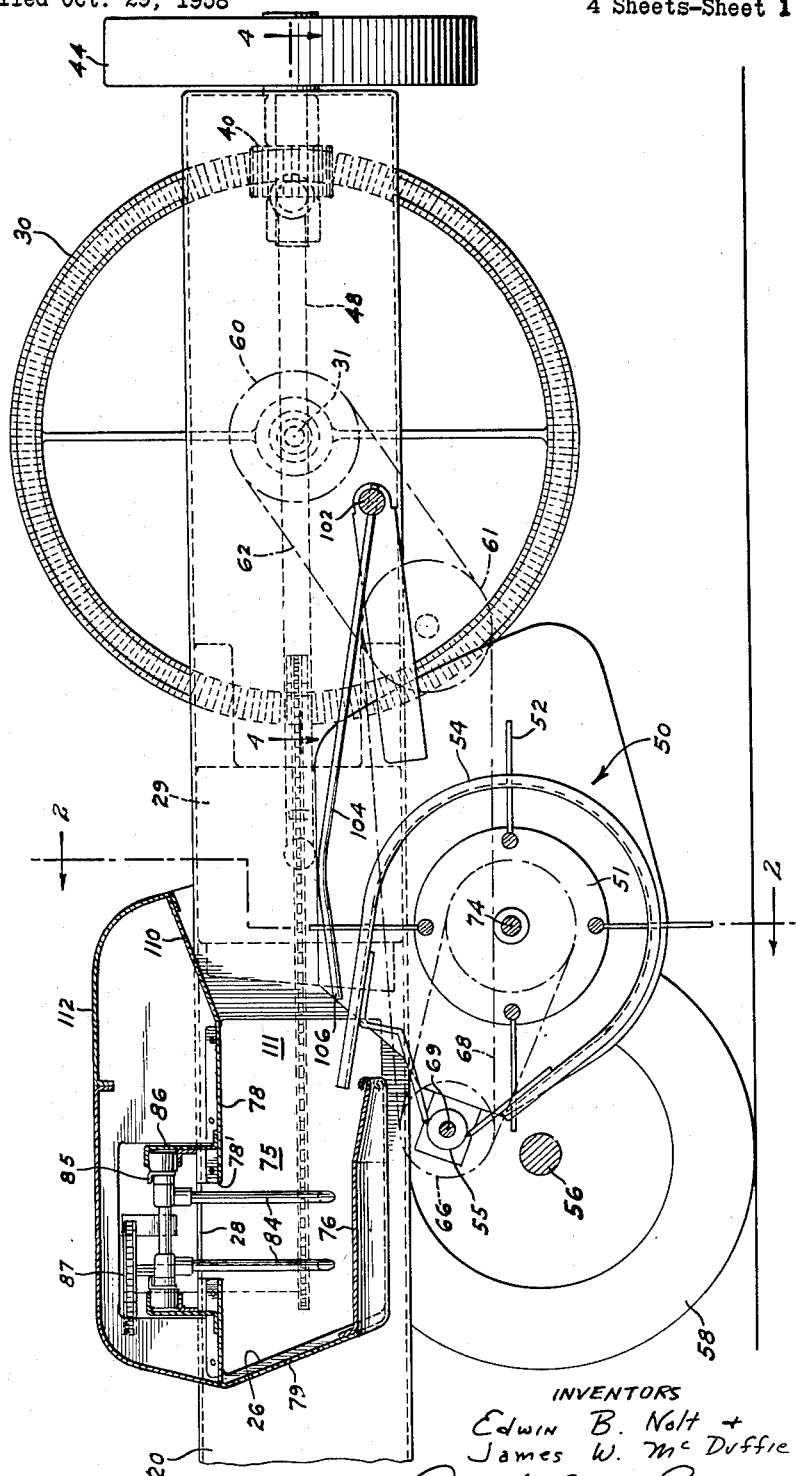
FIG. 1 is a section taken on the line 1—1 of FIG. 2 and showing in side elevation a hay baler constructed according to this invention.
Figure 2:
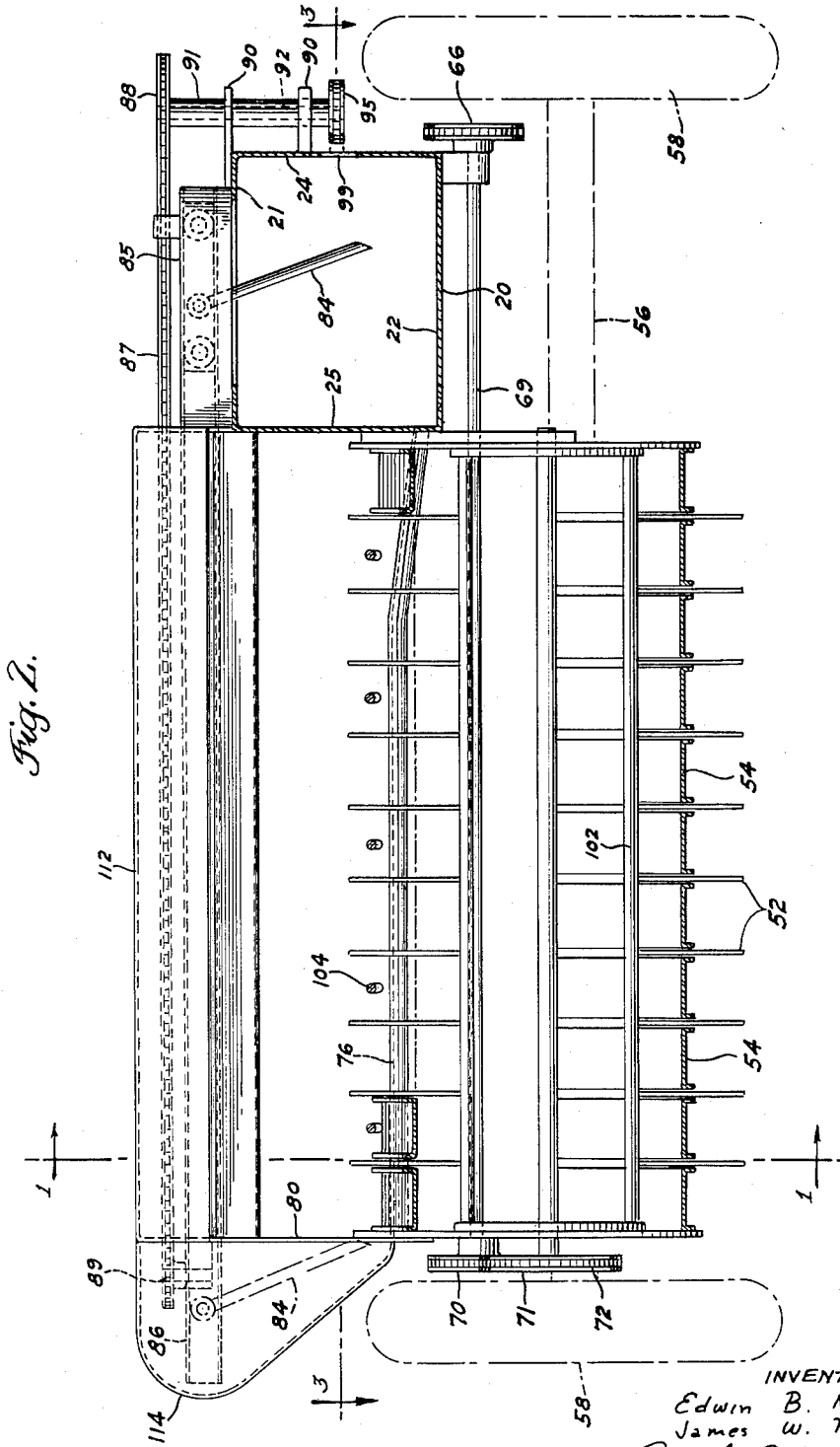
FIG. 2 is a section taken on the line 2—2 of FIG. 1 and looking in the direction of the arrows.

Referring now to the drawings by numerals of reference, 20 denotes a bale case which is rectangular in cross section (FIG. 2). Bale case 20 extends in a fore-and-aft direction relative to ground travel and is disposed in horizontal relation to the ground. The case has a top wall 21, bottom wall 22 and opposed vertical side walls 24 and 25. Side wall 25 has an opening 26 through which crop material may be fed into the bale case. The top wall 21 has an opening or slot 28 (FIG. 1) communicating with opening 26.

Reciprocable fore-and-aft in the bale case 20 is a plunger 29. The plunger is adapted to be reciprocated by a drive comprising a gear 30 extending in a vertical plane and rotatable about a horizontal axis transverse to the reciprocation of said plunger and the extension of said bale case. Gear 30 is supported on a shaft 31 (FIG. 4) journaled in a bearing support 32 connected by bolts 34 to side wall 24 of the bale case. Gear 30 has an inner face 35 and an outer face 36, axially spaced. The outer face 36 has radially extending, angularly spaced gear teeth 38 adjacent the periphery of the wheel which mesh with teeth 39 on a pinion 40. As shown best in FIG. 4, the gear teeth 38 and pinion teeth 39 extend perpendicular to the axis of shaft 31. Also, they project in an axial direction relative to gear 30 and in a radial direction relative to pinion 40. Pinion 40 is keyed to a fore-and-aft extending shaft 41 rotatable in a bushing 42 supported on a portion 43 integral with the member 32 which supports the shaft 31. Shaft 41 is rotated from a source of power not shown such as the tractor used for towing the baler. A conventional flywheel 44 is included in the drive from the source of power to the pinion 40. It will be apparent that when the pinion rotates, the gear 30 will likewise be rotated.

The inside face 35 of gear 30 is provided with a sleeve 45 which supports a pivot pin 46 which extends parallel to the axis of the shaft 31. Pivotally connected to pin 46 is one end of a connecting rod 48 the opposite end of which is pivotally connected to the plunger 29. Thus, when the gear 30 is rotated, the plunger 29 is reciprocated.

Since gear shaft 31 and pinion shaft 41 are carried on the same bearing support 32, if the bearing support shifts relative to the bale case because of bolts 34 becoming loose for some reason, such as vibrations, gear 30 and pinion 40 will still be in the same relation to each other.

In its reciprocating movements, plunger 29 moves rearwardly on a working stroke and past the openings 26 and 28 in side wall 25 and top wall 21, respectively, and then retracts forwardly. Hay delivered to the bale chamber is compressed by the plunger into bales which move progressively rearwardly as they are formed. After each bale is completed, it is banded by a tying mechanism, not shown, and subsequently discharged rearwardly and onto the ground or into a trailing wagon.

Extending alongside of bale chamber wall 25 and forwardly of the opening 26 is a transverse rotatable pickup mechanism 50 comprising a reel 51 (FIG. 1) having angularly spaced rows of radilly projecting pickup fingers 52. The pickup fingers 52 are separated by laterally spaced stripper members 54. The pickup is supported for pivotal movement about a shaft 55 suitably supported on a mobile chassis which includes an axle 56 supported at its opposite ends by ground wheels 58.

The pickup is rotated in a counterclockwise direction when viewed as shown in FIG. 1 through a drive which comprises a sprocket 60 keyed to the shaft 31 of gear 30. Sprocket 60 drives a sprocket 61 through endless chain 62. Sprocket 61 drives to a sprocket 64 through a slip clutch 65, FIG. 3, one element of the slip clutch being connected to sprocket 61 and the other element of the clutch being connected to sprocket 64. Sprocket 64 drives a sprocket 66 through an endless chain 68. Connected to the sprocket 66 is a cross shaft 69 which extends to the outboard side of the baler to a sprocket 70. An endless chain 71 connects sprocket 70 to a sprocket 72 keyed to a shaft 74 carrying reel 51.

Other details of the structure of the pickup and its drive may be similar to that shown in U.S. Patent No. 2,757,602, issued August 7, 1956. However, it will be noted that the pickup drive includes a clutch 65 adapted to slip if the pickup becomes overloaded.

Cut crop material resting on the ground in a windrow is engaged by the fingers 52 and elevated, the material sliding up and over the stripper plates 54, such material then being delivered rearwardly into an infeed chamber 75. Chamber 75 has a platform or base 76, a roof 78, a rear wall 79 and a side wall 80 extending parallel to side wall 25 of the bale case 20. Side wall 80 has an opening 81 in lateral register with the opening 26 in the bale case but of less fore-and-aft width than opening 26.

Platform 76 and roof 78 are parallel to each other as they extend from side wall 80. However, when the platform 76 reaches a point spaced from the side wall 25 of the bale case approximately ¼ the distance of the length of the platform, it diverges downwardly and away from the roof 78 as best shown in FIG. 2. The diverging portion of the platform 76 is denoted 82.

Figure 3:
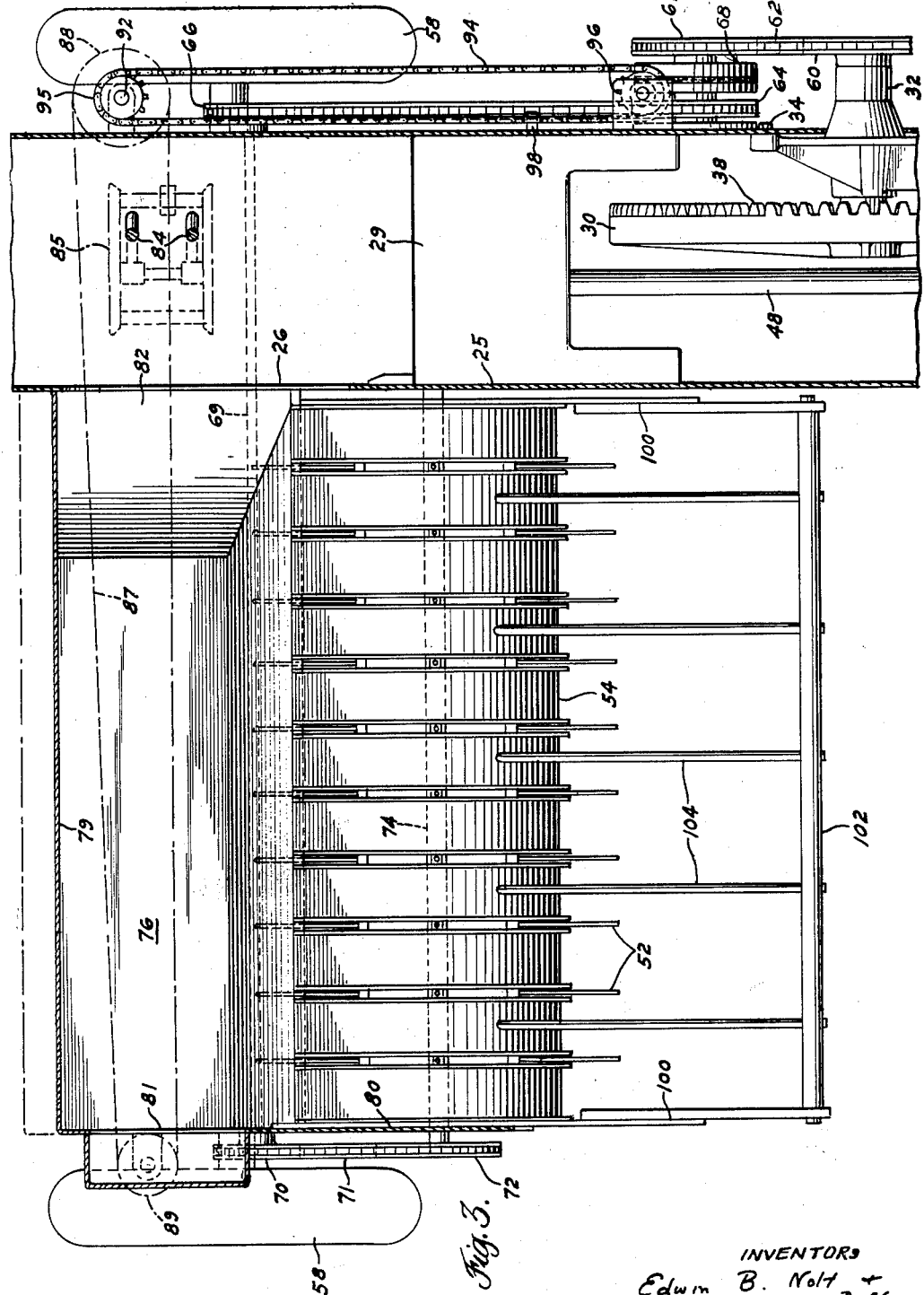
FIG. 3 is a plan view of FIG. 1.

Roof 78 is provided with an opening 78' (FIG. 1) through which feed fingers 84 project downwardly. The feed fingers are supported on a carriage 85 reciprocable on a guide track 86 supported on roof 78. Carriage 85 is moved toward and away from bale case 20 by an oscillating endless chain 87 which extends around relatively spaced sprockets 88 and 89. Sprocket 89 is disposed outwardly of side wall 80 of the infeed chamber 75 (FIGS. 2 and 3). Sprocket 88 is disposed outwardly of the bale case 20. It is connected by means of vertically spaced brackets 90 to the bale case. Brackets 90 carry a sleeve 91 which rotatably supports a shaft 92 rotated by an endless chain 94 extending around sprockets 95 and 96. The sprocket 95 is connected to the lower end of shaft 92, while the sprocket 96 is supported on the side wall 24 of the bale case. The inner reach of chain 94 is connected to plunger 29 by a member 98 (FIG. 3) which projects through a fore-and-aft slot 99 in the bale case. When the plunger 29 is reciprocated, chains 94 and 87 are oscillated. The carriage 85 is moved toward and away from the bale case, the fingers 84 passing into the bale case between successive working strokes of the plunger.

As shown in solid lines in FIG. 2, the fingers 84 extend substantially into the bale case 20 at the end of a working stroke. Further, at the end of a return stroke, the fingers 84 are positioned outside of side wall 80 as indicated by the dotted position of the fingers. Thus, it is seen that the feed fingers move completely across infeed chamber 75 on each working and return stroke. The fingers 84 are connected to the carriage 85 to pivot counterclockwise (FIG. 2) on a return stroke of the feeder whereby they will ride over hay in feed chamber 75. The fingers swing down for the next working stroke and extend generally perpendicular to the platform 76. Stop means, not shown, is provided to hold the fingers perpendicular on a working stroke.

Mounted on the pickup 50, on side walls 100 thereof (FIG. 3), is a windguard structure comprising a cross shaft 102 which extends parallel to the axis of rotation of the pickup and windguard rods 104 which extend rearwardly. The rods have free ends 106 (FIG. 1) which normally are spaced slightly from the stripper members 54 of the pickup. The windguard rods are pivotal about the axis of cross shaft 102, the rods being adapted to raise and lower responsive to the amount of crop material moving over the pickup and into chamber 75.

As shown in FIG. 1, the roof 78 of the infeed chamber has a forwardly and upwardly extending portion 110 which together with the stripper members 54 of the pickup define a throat or inlet 111 to the infeed chamber 75.

The infeed mechanism is enclosed by a hood or housing 112 including a laterally projecting portion 114 which accommodates the carriage 85 in retracted position.

When the baler is towed across a field or cut and windrowed hay, the pickup 50 engages the crop material, elevates it and conveys the material rearwardly into the infeed chamber 75. Carriage 85 reciprocates constantly in timed relation to the reciprocations of the plunger 29. Between successive working strokes of the plunger, that is, movement of the plunger rearwardly in the bale chamber, the feed fingers 84 convey the crop material into bale case 20.

Figure 4:
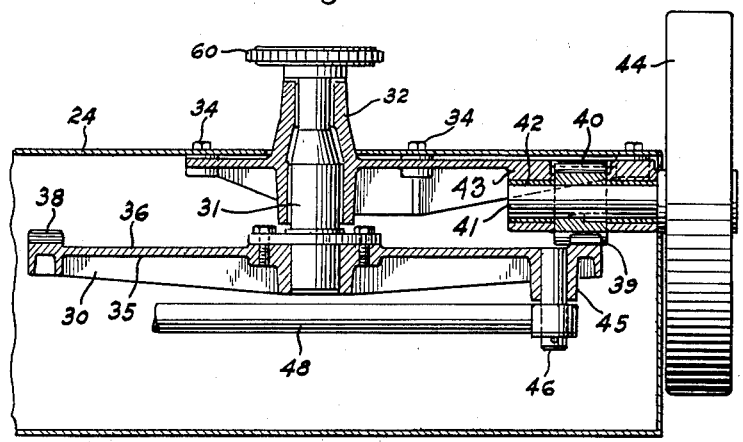
FIG. 4 is a fragmentary section taken on the line 4—4 of FIG. 1 looking in the direction of the arrows and showing the details of the plunger drive means.

In the baler described, an improved means is provided for driving the bale forming plunger. The face gear 30 provides a simple right angle drive from the source of power. The conventional gear box and crank arm is eliminated entirely. As shown in FIG. 4, the face gear and the pinion which drives it are carried on the same casting 32 whereby if it moves because of vibrations during the operation of the baler or for other reasons, the relative positions of the face gear and the pinion will nevertheless remain the same. By providing the teeth 38 on one side 36 of the face gear and having the crank pin 46 projecting from the opposite side of the gear, a very simple and easy means is provided for driving the plunger. Moreover, the longitudinal position of the pinion 40 need not be closely held with this structure since a variation will not affect its engagement with the teeth 38 there being substantial room for manufacturing tolerances.

While this invention has been described in connection with a particular embodiment thereof, it will be understood that it is capable of further modification, and this application is intended to cover any variations, uses, or adaptations, of the invention, following, in general, the principles of the invention and including such departures from the present disclosure as come within known or customary practice in the art to which the invention pertains, and as fall within the scope of the invention or the limits of the appended claims.

Having thus described our invention, what we claim is:

1. In a hay baler, a bale case having a forward end and a rear end, a plunger reciprocable in said bale case toward and away from said rear end, and means mounted on said forward end for reciprocating said plunger, said reciprocating means comprising, in combination, a first rotatable shaft having an axis transverse to said bale case, a gear mounted on said shaft extending in a plane perpendicular to the axis of said shaft and parallel to the reciprocations of said plunger, said gear having an inner face and an outer face spaced axially, a connecting rod, means pivotally connecting one end of said rod to said plunger, means pivotally connecting an opposite end of said rod to said inner face and radially spaced from said transverse axis whereby when said gear is rotated said rod is reciprocated, a second rotatable shaft having an axis extending normal to said transverse axis, a pinion mounted on said second shaft, said gear having angularly spaced gear teeth on said inner face and said pinion having peripheral teeth meshing therewith, said gear and pinion teeth being elongated and located in a common plane parallel to said axis of said second shaft whereby the pinion may be in various axial positions without changing the radial mesh of the pinion teeth with the gear teeth.

2. In a hay baler, a bale case having a forward end and a rear end, a plunger reciprocable in said bale case toward and away from said rear end, and means mounted on said forward end for reciprocating said plunger, said reciprocating means comprising, in combination, a one piece support connected to said bale case, first and second shafts rotatably mounted on said support and disposed at right angles to each other, said first shaft extending transverse to said bale case and said second shaft extending parallel to the reciprocation of said plunger, a gear and pinion mounted on said first and second shafts respectively, said gear having an inner face and an outer face spaced axially, angularly spaced teeth on said gear inner face, teeth on the periphery of said pinion meshing with said gear teeth, said gear and pinion teeth being elongated and located in a common plane parallel to said axis of said second shaft and perpendicular to the axis of said first shaft whereby axial movement of said pinion on said second shaft does not change the radial projection of the pinion teeth into said gear teeth, a connecting rod, means pivotally connecting a rear end of said rod to said plunger, and means pivotally connecting an opposite forward end of said rod to said gear outer face and at a point spaced radially from said transverse axis whereby when the gear is rotated said rod is reciprocated.

3. In a hay baler, a bale case having a forward end, a rear end, a pair of vertical side walls and a front wall, a plunger reciprocable in said bale case toward and away from said rear end, and means mounted on said forward end for reciprocating said plunger, said reciprocating means comprising, in combination, a one piece support connected to the inside of one of said side walls of said bale case, first and second shafts rotatably mounted on said support and disposed at right angles to each other, said first shaft extending through said one side wall and transverse to said bale case and said second shaft extending through said front wall and parallel to the reciprocation of said plunger, a flywheel outside of said bale case and mounted on said second shaft, a gear and pinion located inside said bale case and mounted on said first and second shafts respectively, said gear having an inner face facing said one side wall and an outer face remote therefrom, angularly spaced teeth on said gear inner face, teeth on the periphery of said pinion meshing with said gear teeth, said gear and pinion teeth being elongated and located in a common plane parallel to said axis of said second shaft and perpendicular to the axis of said first shaft whereby axial movement of said pinion on said second shaft does not change the radial projection of the pinion teeth relative to said gear teeth, a connecting rod, means pivotally connecting a rear end of said rod to said plunger, and means pivotally connecting an opposite forward end of said rod to said gear outer face and at a point spaced radially from said transverse axis whereby when the gear is rotated said rod is reciprocated.

References Cited in the file of this patent
UNITED STATES PATENTS

| | | |
|---|---|---|
| 204,185 | Bettis et al. | May 28, 1878 |
| 483,678 | St. John | Oct. 4, 1892 |
| 504,033 | Harrington | Aug. 29, 1893 |
| 2,489,198 | Russell | Nov. 22, 1949 |
| 2,560,113 | Kennedy | July 10, 1951 |